United States Patent [19]

Matzinger et al.

[11] Patent Number: 5,000,903
[45] Date of Patent: Mar. 19, 1991

[54] METHOD OF MOLDING PLASTIC PRODUCTS HAVING CHEMICALLY BONDED PROTECTIVE COATINGS

[75] Inventors: James E. Matzinger, Toledo; Robert D. Kroshefsky, Perrysburg; William R. Weaver, Toledo, all of Ohio

[73] Assignee: Libbey-Owens-Ford Co., Toledo, Ohio

[21] Appl. No.: 334,303

[22] Filed: Apr. 6, 1989

[51] Int. Cl.$^5$ .............................................. B29C 45/14
[52] U.S. Cl. .................................. 264/511; 264/135; 264/138; 264/265; 264/266; 264/267
[58] Field of Search ............... 264/511, 135, 265, 266, 264/267, 138

[56] References Cited

U.S. PATENT DOCUMENTS

| | | | |
|---|---|---|---|
| 3,390,214 | 6/1968 | Woods | 264/511 |
| 3,502,760 | 3/1970 | Omo | 264/135 |
| 3,801,244 | 4/1974 | Eisenberg | 264/135 |
| 4,278,629 | 7/1981 | Bennett | 264/135 |
| 4,339,144 | 7/1982 | Nagasaka | 264/135 |
| 4,622,191 | 11/1986 | Takeuchi | 264/265 |
| 4,639,341 | 1/1987 | Hanamoto et al. | 264/511 |

FOREIGN PATENT DOCUMENTS

| | | | |
|---|---|---|---|
| 3002560 | 6/1981 | Fed. Rep. of Germany | 264/511 |
| 111668 | 9/1981 | Japan | 264/511 |
| 29422 | 2/1982 | Japan | 264/511 |
| 14922 | 1/1986 | Japan | 264/511 |
| 137716 | 6/1986 | Japan | 264/265 |
| 149122 | 6/1988 | Japan | 264/511 |

*Primary Examiner*—James Lowe
*Attorney, Agent, or Firm*—Marshall & Melhorn

[57] ABSTRACT

Coated plastic products are prepared by chemically bonding a protective coating material to at least a portion of the surface of a plastic substrate, by disposing a web of a protective coating material over the cavity of a mold, and thereafter injecting polymeric precursor materials into the mold behind the web thereby conforming the web to the surface of the mold cavity. As the polymeric precursor materials react in situ to form the plastic substrate, they also chemically bond to the protective coating material.

18 Claims, 4 Drawing Sheets

METHOD OF MOLDING PLASTIC PRODUCTS HAVING CHEMICALLY BONDED PROTECTIVE COATINGS

FIELD OF THE INVENTION

The present invention relates generally to molded plastic products, and more particularly, to a molded plastic product having chemically bonded to the surface thereof a protective coating material, and a process and apparatus for the manufacture of the chemically bonded composite.

BACKGROUND OF THE INVENTION

Methods for the production of molded plastic products, which are useful for example for automotive body panels, are well known in the art. Typically, such molded plastic automotive components may be manufactured by reactive molding processes, such as for example "reaction injection molding" (RIM) in which a polyisocyanate, a polyol and a chain extender are brought together in a simple operation (the polyol and chain extender may be preblended if desired) and immediately injected into a mold cavity. Other polymeric materials, such as for example polyesters, epoxies, and polyamides, may likewise be utilized in RIM-type reactive molding processes, and other molding processes, such as for example bulk molding, may be used to form the molded plastic products. The highly reactive liquid starting materials (polymeric precursors) are injected into the mold, generally after having been mixed in what is commonly known as a "positively controlled mixing head".

Reaction injection molded polyurethanes are disclosed in British Pat. No. 1,534,258 and German Auslegeschrift No. 1,196,864, U.S. Pat. No. 3,655,597 discloses reacting polyisocyanate, polyol, blowing agent, diamine and catalyst for the manufacture of molded polyurethane components. A detailed description of the RIM process may be found in Prepelka and Wharton "Reaction Injection Molding in the Automotive Industry." Journal of Cellular Plastics, vol. II. no. 2, 1975. The RIM process has also been advantageously employed in the so-called "encapsulated automotive glazing" manufacturing process, wherein a polyurethane gasket is formed around the perimeter of a glazing unit of transparent material such as glass. See U.S. Pat. No. 4,561,625. Polyester resins and epoxy resins generally useful for reactive molding processes are disclosed in U.S. Pat. Nos. 4,405,538 and 4,581,393, respectively. Reactive molding processes employing polyamides are generally disclosed in the "Kirk-Othmer Concise Encyclopedia of Chemical Technology", John Wiley & Sons, New York, pp. 915-920 (1985).

The reactive molding process may suitably employ any flowable polymeric precursor materials which may be injected into a mold cavity where the polymeric materials react in situ to prepare the desired plastic product. Polyurethane precursors are typically used for the production of rigid automotive components such as bumpers, and for the production of flexible body parts generally known in the motor industry as "soft face elements".

The molded plastic products described hereinabove may be susceptible to degradation upon extended exposure to the environment, particularly the effects of ultraviolet radiation resulting from prolonged exposure to sunlight. In order to minimize the possible deleterious effects of such exposure it is generally necessary to provide the surfaces of the molded plastic components which are to be exposed to the environment, particularly those surfaces which are to be exposed to sunlight, with a protective coating. To that end, exposed surfaces of molded plastic components have heretofore generally been coated with a weather-stable paint which protects the molded plastic component from the effects of ultraviolet radiation. This procedure, of post painting the surfaces of plastic components following the molding process, involves substantial processing costs. Other methods of applying a protective coating, such as for example in-mold coating, likewise increase processing costs in other ways. Finally, post-molding applied protective paint is attached to the molded plastic component by means of mechanical adhesion, which makes the paint susceptible to chipping and pealing where the mechanical bond fails.

SUMMARY OF THE INVENTION

Accordant with the present invention, there is provided a process for the production of a molded plastic product, having a weather stable protective coating material chemically bonded to the surface thereof, the chemical bonding occurring during the in situ curing of the reactive molding process by which the molded plastic product is formed. More particularly, there is provided a two-part mold whose sections cooperate to define a mold cavity for the forming and in situ curing of a reactive molded plastic product, and means for inserting a flexible film of protective coating material between the sections of the mold, such that when the mold sections are brought together and the reactive molding polymeric precursors are injected into the mold cavity, the polymeric precursors react to produce the molded plastic component and simultaneously chemically bond to the surface of the protective coating material with which the polymeric precursors are in contact.

Provision is made for drawing a film of the protective coating material over the mold section having that portion of the mold cavity which defines the molded plastic product surface to which the protective coating material is to be chemically bonded. The mold sections are brought together so as to define the mold cavity. The reactive molding polymeric precursors are introduced over the protective coating material to fill the mold cavity, and conform the protective coating material to the configuration of the mold cavity in the associated mold section. As the polymeric precursors react and cure, the protective coating material chemically bonds to the surface of the molded plastic product, and thereby, the protective coating material becomes an integral part of the reactive molded plastic product. Upon completion of the simultaneous curing and chemical bonding processes, the mold sections are separated and the molded plastic product having the protective coating material chemically bonded thereto is removed. Excess protective coating material is typically then trimmed from the periphery of the molded plastic product.

The protective coating material, while rigid enough to be drawn over the mold, is generally sufficiently flexible and stretchable to be formed to the configuration of the mold cavity by the injecting of the polymeric precursors therebehind. However, it is contemplated that heated air for example may be admitted into the mold cavity prior to injection of the polymeric precursors, to condition the protective coating material and thereby assist its conformation to the configuration of the mold cavity. Alternatively, vacuum means may be provided for assistance in drawing the protective coating material into conformity with the surface of the mold cavity during injection of the polymer precursors. These "assists" additionally eliminate the possibility of the film wrinkling, if a tendency toward same exists. Moreover, the mold itself may by heated to an elevated temperature to aid both the conditioning of the protective coating material and the curing and chemical bonding of the reactive molded plastic product and protective coating material integral composite.

The coated plastic products having a protective coating material chemically bonded thereto are particularly useful for automotive body components.

BRIEF DESCRIPTION OF THE DRAWINGS

The novel features, which are characteristic of the present invention, are set forth with particularity in the appended claims. The invention itself, however, both as to structure and process of manufacture, will best be understood from the following description of specific embodiments, when read in connection with the accompanying drawings, in which:

DETAILED DESCRIPTION OF THE PREFERRED EMBODIMENT

Figure 1:
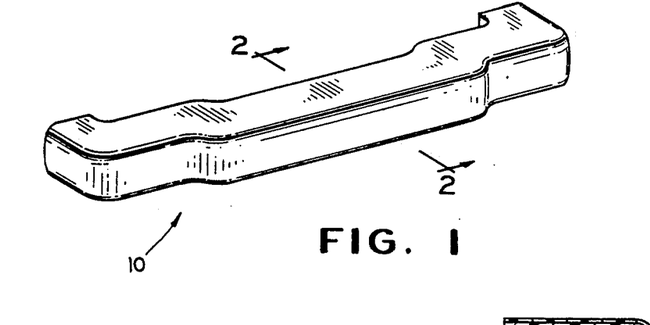
FIG. 1 is a perspective view of a molded plastic product having a protective coating material chemically bonded thereto, embodying the present invention.
Figure 2:
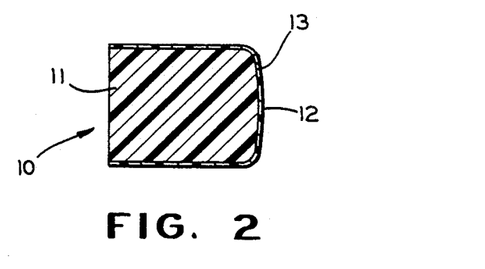
FIG. 2 is a sectional view taken along the line 2—2 of FIG. 1, illustrating the structure of the molded plastic product and the protective coating material bonded thereto.

Referring now to the drawings, and particularly FIGS. 1 and 2, there is shown generally at 10 a molded plastic product having a protective coating material chemically bonded thereto, the composite hereinafter referred to as a "coated plastic product," embodying the present invention, and suitable for installation on an automotive vehicle as a bumper. It will be readily appreciated that the coated plastic product may likewise be of a shape suitable for installation as an automotive body panel, a flexible automotive component generally known in the art as a soft face element, as well as for various other types of plastic components for non-automotive uses.

More specifically, the coated plastic product 10 comprises a plastic substrate 11, generally prepared by a reactive molding process, and protective coating material layer 12 chemically bonded thereto by chemical reaction which occurs generally at the interface 13 during the reactive molding curing process. The visibly exposed surface of the protective coating material 12, opposite the surface which is bonded to the plastic substrate 11, is generally referred to as the finished surface of the molded plastic product 10.

As hereinbefore explained, the protective coating material layer 12 is chemically bonded to the plastic substrate 11 during the reactive molding process, which occurs in conjunction with a process for inserting a film of protective coating material between the mold halves prior to the injection of the reactive molding polymeric precursor materials. Accordingly, there is shown generally at 14 in FIG. 3 one embodiment of an apparatus constructed in accordance with the invention for fabricating the coated plastic product 10 of the present invention. The apparatus 14 includes a mold 15, for forming the plastic substrate 11 and protective coating material layer 12, and a web or film transport mechanism 16 for providing a continuous film 32 of protective coating material, for continuous advancement between the mold halves. The mold comprises cooperating upper or first and lower or second mold halves or section 17 and 18, respectively, including means for suitably opening and closing the mold sections. The lower mold section 18 may, for example, be stationarily mounted upon a base 19, while the upper mold section 17 is mounted for reciprocating movement toward and away from the lower mold section 18 as by a cylinder 20.

Figure 4:
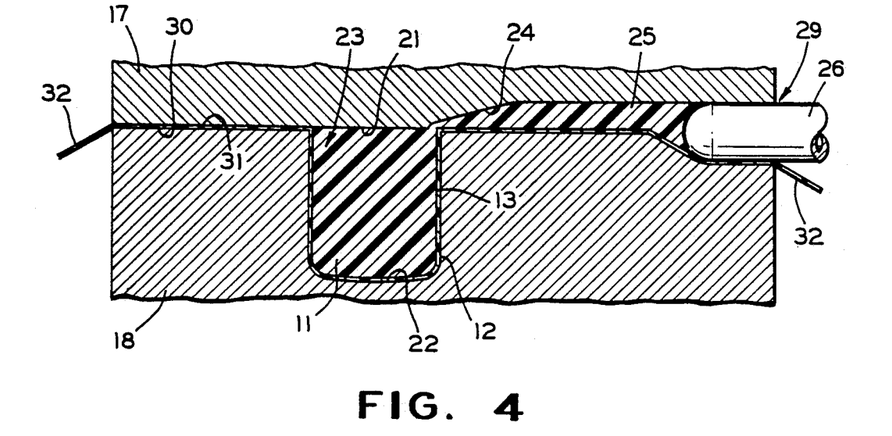
FIG. 4 is an enlarged, fragmentary, sectional view of the closed mold structure, illustrating the position of the protective coating material within the mold, during the formation of the molded plastic product and the protective coating material and the chemical bonding therebetween.

As shown in FIG. 4, the mold sections 17 and 18 are provided with centrally disposed recessed portions 21 and 22, respectively, in facing relationship to one another such that when the mold sections are closed, the recessed portions 21 and 22 cooperate to define a mold chamber 23 for receiving the reactive molding polymeric precursor materials.

The mold chamber 23 communicates with an inlet means or gate 24 and associated mixing head or chamber 25 for receiving the polymeric precursor materials as from a positively controlled mixing head 26. Corresponding depressions 27 and 28 within the upper and lower mold sections 17 and 18, respectively, define a port 29 for receiving the positively controlled mixing head tip 26, allowing it to communicate with the mixing chamber 25 when the mold is closed. The polymeric precursor materials are adapted to polymerize or cure in situ to form the plastic substrate 11, and to chemically bond to the protective coating material 12 generally at interface 13. The mold sections 17 and 18 include surfaces 30 and 31, respectively, which face one another outwardly of the mold chamber 23, and together define a mold parting plane.

The mold chamber 23 is of a cross-sectional configuration to produce, in FIG. 4, an automobile bumper which, when installed on a vehicle, will present a pleasing, finished appearance, and additionally will expose to the environment a protective coated surface.

Accordant with the invention, a protective coating material 12 is chemically bonded to the surface of the plastic substrate 11 during a process in which a web or film 32 of the protective coating material is drawn over the lower mold section 18. After closing the mold, the polymeric precursor materials are injected behind the film 32 of protective coating material, to press the film 32 into conformity with and fill the mold chamber 23. By the term "behind the film", as it is used herein, is meant that the polymeric precursor materials are injected adjacent the film in such a manner so as to urge the film into intimate contact with the portion of the mold cavity surface which defines the outer, finished surface of the ultimate product. While polymerizing or curing, the polymeric precursor materials additionally react with the molecular structure of the protective coating material 12, generally at the interface 13, and thereby chemically bond thereto. Alternatively, a primer may initially be placed on the surface of the film 32, and thereafter, the polymeric precursor materials will react with and bond to the primer material.

Suitable protective coating materials include, but are not limited to polyvinyl chloride, acrylic polymers, polyethylene, polyester, polyurethane, polyvinylidene fluoride, polyvinyl fluoride, and the like. The thickness of the protective coating materials are conveniently in the range from about 0.5 to 15 mils. and are generally known in the polymeric film art, as well as commercially available. The thicker films provide a particularly desirable surface finish, as well as a weather stable coating, i.e., resistant to degradation by ultraviolet radiation. Good results may be obtained utilizing a polyvinyl fluoride manufactured and sold by DuPont under the name TEDLAR, as well as an acrylic polymer manufactured and sold by Polymer Extruded Products (Newark, N.J.) under the name KORAD. A preferred protective coating material is about a 3 to 4 mil thick film of polyvinyl chloride. In some cases, it is beneficial to treat the film prior to it's use in the process of the present invention, to prepare sites of increased chemical reactivity on the surface thereof, and thus enhance the chemical bonding of the curing polymeric precursor materials thereto. Specifically, the surface of the protective coating material film may be treated by corona discharge, plasma discharge, flame treatment, or application of an organo metallic primer such as gamma-methacryloxypropyltrimethoxysilane. Also contemplated by the term "protective coating material", as equivalent in operability and utility, are laminated multilayered films prepared from the polymeric materials disclosed hereinabove, as well as multilayered films having a decorative outer layer.

Suitable polymeric precursor materials for manufacturing the molded plastic articles having a protective coating of the present invention include polyurethane precursors typically used for the reaction injection molding (RIM) process. These include isocyanates, such as for example methylene-di-p-phenylene isocyanate and toluene diisocyanates, and polyols which preferably are either polyether polyols or polyester polyols. Generally the polyurethane precursor materials also include various chain extenders and curing agents such as for example diamine compounds either alone or in various blends. Polyurethane precursors typically comprise a two-part composition that is mixed just prior to or upon injection into a mold cavity, so that all or substantially all of the reaction occurs within the mold cavity after injection. One component comprises the isocyanate, and the other component comprises the polyol, chain extender, curing agent, and optional additives. Specific methods for preparing polyurethane precursors useful for the present invention are more fully set forth in U.S. Pat. Nos. 4,218,543 and 4,269,945, which are hereby incorporated in their entirety by reference thereto.

Additionally suitable polymeric precursors include those used to prepare polyamides. These include monoaminomonocarboxylic acids, or internal lactams thereof, as well as substantially equimolar mixtures of diamines and dicarboxylic acids. Examples of a convenient monoaminomonocarboxylic acid and lactam are epsilonaminocaproic acid and caprolactam. Suitable diamines include hexamethylenediamine and tetramethylenediamine. Useful dicarboxylic acids include adipic acid and glutaric acid. Processes for preparing polyamides utilizing these as well as other precursors are thoroughly disclosed in "Polyurethanes Chemistry and Technology", Robert E. Krieger Publishing Company, Inc., Malabar, Fla. (1983).

Other suitable polymeric precursor materials include, but are not limited to, crosslinkable polyester and epoxy resins, which are typically employed in reactive molding processes. The polyester resins generally comprise unsaturated polyesters dissolved in a polymerizable ethylenically unsaturated monomer such as for example styrene, and a crosslinking initiator. Useful epoxy resins generally comprise ethers containing the epoxide group and aliphatic polyols, which together cure readily in the presence of amine catalysts. Processes for preparing crosslinkable polyester and epoxy resins are more fully set forth in E. E. Schildknecht. "Polymer Process", vol. X, Interscience Publishers (1956).

The polymeric precursor materials may additionally contain conventional adjuvants, such as for example blowing agents, fillers, thermal stabilizers, dyes, flame retardants, pigments, plasticizers, antistatic agents, ultraviolet ray absorbers, lubricants, and the like. Preferred polymeric precursors are those used to prepare polyurethanes.

Figure 3:
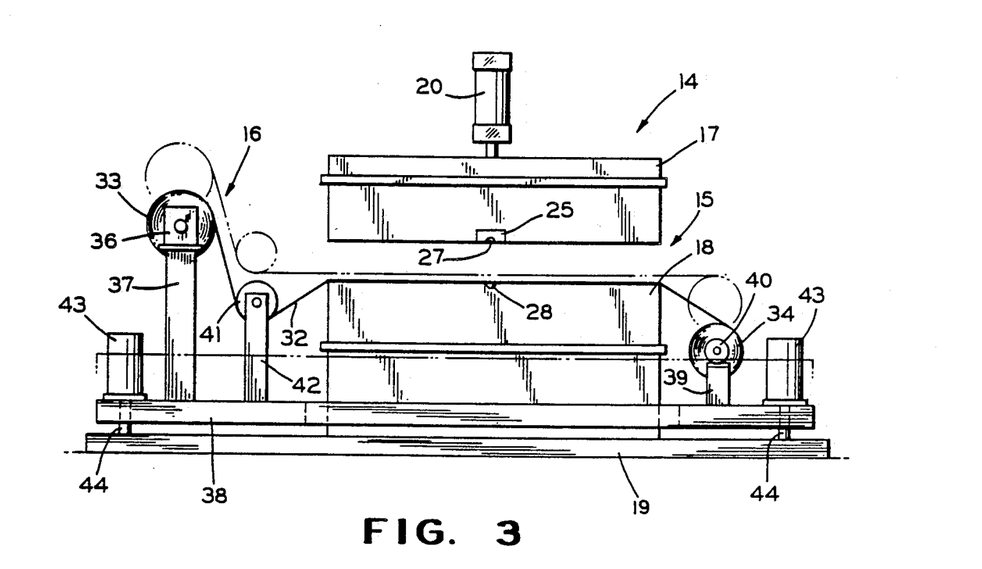
FIG. 3 is a side elevational view of one embodiment of the apparatus of the invention.
Figure 5:
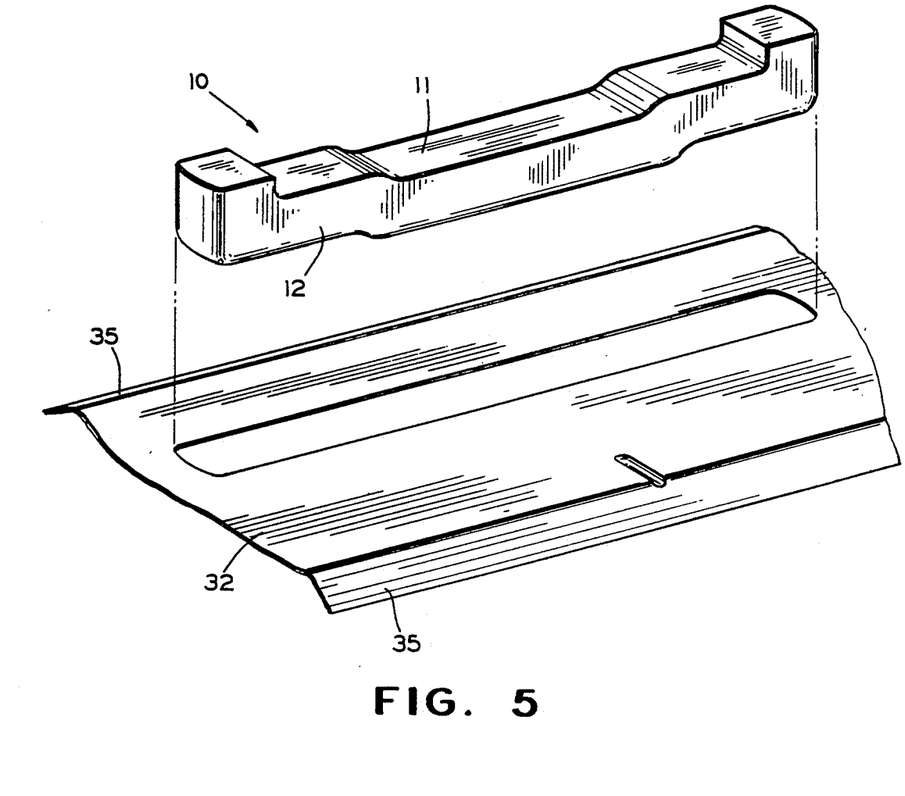
FIG. 5 is a perspective view illustrating separation of the molded plastic component and chemically bonded protective coating material composite of FIG. 1 from the protective coating material stock.

In order to properly position the web 32 between the upper and lower mold sections 17 and 18, respectively, and to provide for periodic advancement of the web following each mold cycle, a protective coating material web transport mechanism 16, illustrated in FIG. 3, may be employed, including a supply roll 33 of the web material mounted at one end of the mold 15. A take-up reel 34 is positioned at the opposite end of the mold for drawing the web 32 through the mold and accumulating the salvage film material following each molding cycle. The web 32 may be somewhat wider than the mold 15 so that the marginal edge portions 35 project beyond the mold sections 17 and 18, as shown in FIG. 5, to assist in maintaining the width of the web as the mold is closed. It is necessary that the web 32 be maintained in a taut, wrinkle-free condition as it extends through the mold in order to produce a smooth protective coating material finish of pleasing appearance on the coated plastic product.

Thus, the supply roll 33 is journalized and supported at its ends in a tension brake mechanism 36, mounted upon stands 37, carried by a vertically reciprocating platform 38. The take-up reel 34 is mounted in journals upon pedestals 39, likewise carried by platform 38. A motor 40 is provided for driving the take up reel to periodically withdraw the web 32 from the supply roll 33 and across the mold 15, against the restraining effect of the brake mechanism 36. In order to prevent it from narrowing, the web 32 passes in contact with a width-maintenance or spreader roll 41, journalized to rotate freely on stands 42 which are mounted on the platform 38. As will be hereinafter more fully described, the platform 38 and the web transport mechanism 16 thereon is adapted to move between the lowered molding position, illustrated by solid lines in FIG. 3, and the elevated web advancement position, illustrated by broken lines in FIG. 3 Raising and lowering may be accomplished by means of cylinders 43 affixed to the platform, with their extensible piston rods 44 extending through the platform 38, to the stationary base 19.

Briefly reviewing the operation of the preferred embodiment, with the mold 15 in the open position, the platform 38 is raised from the solid to the broken line position, as illustrated in FIG. 3. The take-up reel 34 is driven by the motor 40, to withdraw the web 32 from the supply roll 33, against the braking action of the break mechanism 36, so as to be maintained in a taut, wrinkle-free condition. As will be noted in FIG. 3, the spreader roll 41 and the take-up reel 34 will be at such an elevation that the web 32 extending therebetween assumes a position slightly above the surface 31 of the lower mold 18. It is suggested that any accumulated dirt may be removed from the film 32 prior to its insertion between the mold halves 17 and 18 by conveniently directing deionized air, with or without heated air, onto the surface of the film by conventional means (not shown). When the web 32 has advanced sufficiently, the platform 38 is lowered to the solid line position so that the web 32 is positioned at the surface 31 of the lower mold section 18. The protective coating material web 32 is sufficiently resilient to stretch over the mold between the spreader roll 41 and the take-up reel 34, and furthermore to preclude wrinkling.

The mold is closed by lowering the upper mold section 17, to bring the surfaces 30 and 31 into engagement with the 25 web 32 therebetween. The web 32, will thereby extend generally planarily across the mold chamber 23. The protective coating material is generally sufficiently stretchable so that, upon introduction of the polymeric precursor materials through the mixing chamber 25 and gate 24 from the positively controlled mixing head tip 26, along the upper surface of (behind) the web 32, the protective coating material will be stretched and depressed into conformity with the surface of the mold chamber 23 which defines the surface of the coated plastic article. As the polymeric precursor materials polymerize or cure to form the plastic substrate 11, the protective coating material 12 chemically bonds thereto, generally at the interface 13, to form an integral weather stable coated plastic product composite.

Upon completion of the curing and chemical bonding process, the coated plastic product 10, illustrated in FIG. 5, may be removed from the web 32 by running a cutting device around the outer perimeter of the coated plastic product 10. The web 32 may then be advanced by winding the salvage material upon the take-up reel 34, to ready the apparatus for the next molding cycle.

As indicated above, in order to chemically bond the protective coating material smoothly, so as to have a pleasing appearance on the finished product, it is important that the web 32 be wrinkle-free across the mold chamber 23 as the polymeric precursor materials are injected into the mold 15. Drawing the web 32 in contact with the spreader roll 41 and across the lower mold section 18, and thereafter lowering the platform 38 to stretch the web 32 as in the embodiment of FIG. 3, will generally avoid such wrinkling.

Figure 6:
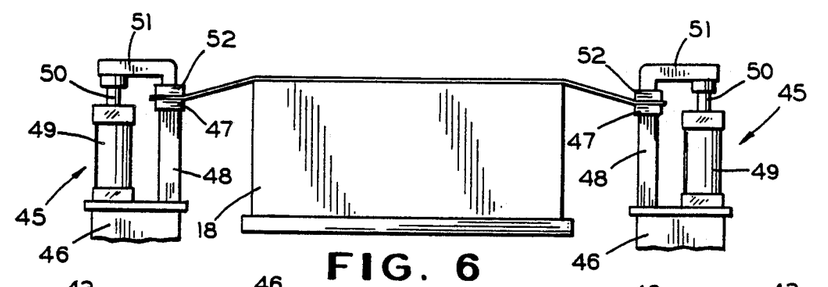
FIG. 6 is an elevational view taken substantially along line 6—6 of FIG. 7.
Figure 7:
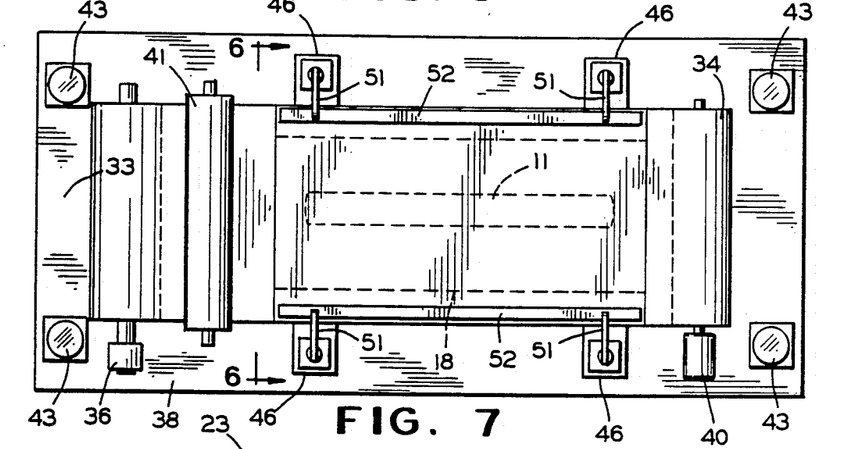
FIG. 7 is a plan view illustrating an alternate embodiment of the invention, incorporating side clamps for the protective coating material.

There is shown in FIGS. 6 and 7 an alternative embodiment of the invention for laterally securing and stretching the web 32 in those instances where there may be a tendency for the material to wrinkle. Thus, there is provided along either side edge of the mold a securing mechanism 45 for gripping the marginal edge portions 35 of 25 the web 32. Each such mechanism includes a pair of mounting stands 46, carried by the platform 38 for vertical reciprocating movement therewith. A lower clamp bar 47 extends between the spaced apart mounting stands 46, beneath the edge of the web 32, and is carried by posts 48 supported on the mounting stands. Also carried by each mounting stand 46 is a cylinder 49 which may, for example, be a conventional hydraulic cylinder. The piston rod 50 of each cylinder carries an arm 51, to which is attached one end of a longitudinally extending upper clamping bar 52 disposed above and in cooperating relationship with the lower clamping bar 47.

In operation, with the piston rod 50 extended and the platform 38 elevated to the broken line position of FIG. 3, the web is advanced to a suitable position over the lower mold section 18, with its marginal edge portions 35 between the spaced lower and upper clamping bars 47 and 52 respectively. The piston rod 50 is retracted to clamp the marginal edge portions 35 of the web 32 between the clamping bars 47 and 52. The platform 38 is then lowered to the solid line position of FIG. 3, whereupon the web 32 is stretched laterally across the lower mold section 18, as shown in FIG. 6, as well as longitudinally, as shown in FIG. 3.

Figure 8:
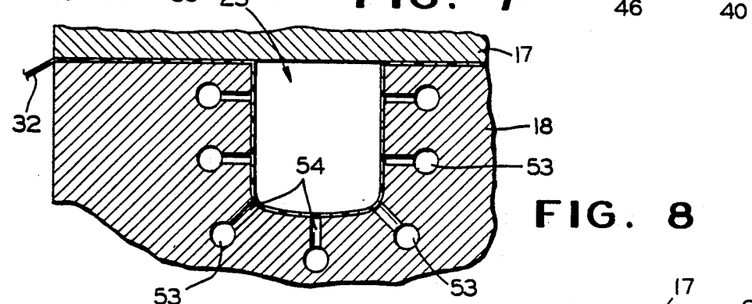
FIG. 8 is an enlarged, fragmentary, sectional view of an alternate embodiment of the mold structure, incorporating a vacuum assist system.

For most protective coating materials, the web 32 will readily conform to the surface of the mold chamber 23 upon injection of the polymeric precursor materials. In those instances where it may be desirable to deform the protective coating material prior to the introduction of the polymeric precursor materials, or to provide assistance in conforming the protective coating material to the surface of the mold chamber 23, the embodiments of FIGS. 8 and 9 may be utilized. Thus, in the embodiment of FIG. 8, the lower mold section 18 is provided with conduits 53 selectively coupled to a vacuum source (not shown). The conduits 52, in turn are in communication with a series of perforations 54 spaced along an opening to the surface of the mold chamber 23. With the mold closed, and the web 32 in place, application of vacuum to the conduits 53 will thus draw the web 32 material against the surface of the mold chamber 23, prior to or in conjunction with the injection of the polymeric precursor materials.

Figure 9:
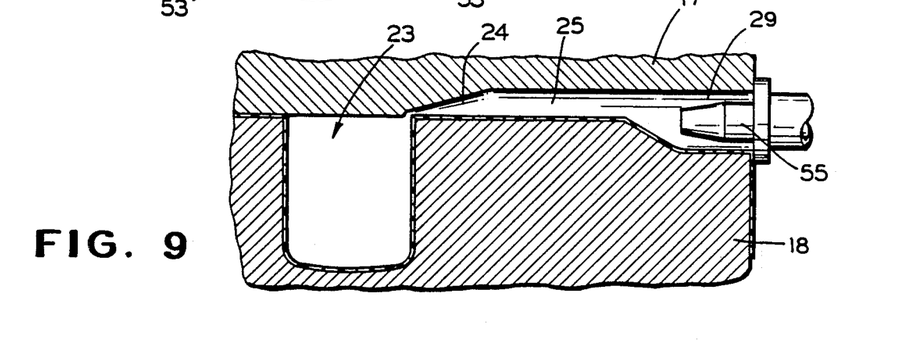
FIG. 9 is an enlarged, fragmentary, sectional view of the mold structure, illustrating an arrangement for hot air conditioning of the film prior to injection of the reaction injection molding polymeric precursor materials.

In the embodiment of FIG. 9, a tubular outlet 55 of a conventional air preheater (not shown) is directed into the port 29, prior to insertion of the positively controlled mixing head tip 26. Suitably heated air is forced under pressure into the mold chamber 23, above the web 32 of protective coating material. The protective coating material is thus preheated, so as to be more readily deformable, and is additionally urged toward the surface of the mold chamber 23. After a suitable period of time, introduction of heated air into the mold chamber is discontinued, and the polymeric precursor materials are injected into the mold chamber 23, immediately after which the polymeric precursor materials begin to polymerize and chemically bond with the protective coating material.

Figure 10:
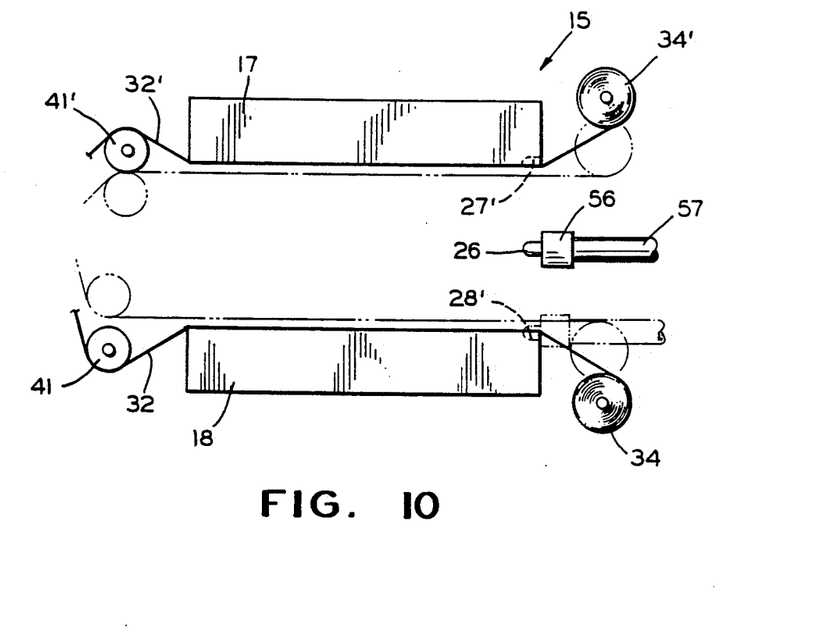
FIG. 10 is a side elevational view of an alternate embodiment of the apparatus of the invention, illustrating the employment of protective coating material in both halves of the mold, and including a movable positively controlled mixing head.
Figure 11:
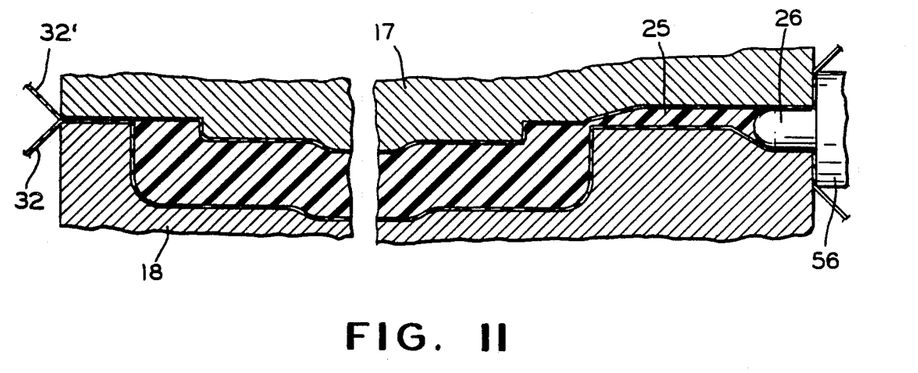
FIG. 11 is an enlarged, fragmentary, sectional view of the closed mold structure of the FIG. 10 alternate embodiment, illustrating the protective coating material employed in both halves of the mold, during the formation of the molded plastic product and protective coating material and the chemical bonding therebetween.

FIGS. 10 and 11 illustrate an alternative embodiment of the present invention, wherein protective coating material is employed in both halves of the mold 15'. Thus, there is provided a second web transport mechanism (not entirely shown), having a protective coating material spreader roll 41', over which a web 32' is drawn across the surface 30' of the upper mold section 17', and subsequently surplusage web material is accumulated on take-up reel 34'. The web transport mechanism cooperates in the same manner with the upper mold section 17', as does the web transport mechanism 16 and lower mold section 18, illustrated in FIG. 3, and explained in detail hereinabove. Also illustrated in FIG. 10 is a vertically movable positively controlled mixing head 56, having an injection tip 26, connected to a control arm 57 which is adapted to move vertically by conventional mechanical means (not shown), from the position between the mold sections as illustrated by solid lines in FIG. 10, to the position indicated by broken lines in FIG. 10, wherein the positively controlled mixing head tip 26 is received into the port formed by corresponding depressions 27' and 28' within the upper and lower mold sections 17' and 18', respectively, when the mold is closed.

In operation, the mold sections 17' and 18' are brought together, and simultaneously, the positively controlled mixing head 56 is lowered to the position indicated by broken lines in FIG. 10, such that the tip 26 is enclosed by the port formed as corresponding depressions 27' and 28' are brought together. The closed mold thereafter has two webs 32 and 32' of protective coating material positioned planarily between the mold sections 17' and 18'. Additionally, the positively controlled mixing head tip 26 is positioned to inject the polymeric precursor materials into the mold chamber 23, between the webs 32 and 32' of protective coating materials. As the injected polymeric precursor materials polymerize or cure, the protective coating material supplied by webs 32 and 32' chemically bonds to the entire peripheral surface of the plastic substrate 11.

FIG. 11 illustrates the closed mold structure of the embodiment of FIG. 10, showing mold sections 17' and 18', having therebetween two layers of protective coating material 32 and 32. Also shown is the positively controlled mixing head tip 26 positioned to allow the injection of the polymeric precursor materials into the mixing chamber 25, thence to the gate 24, and finally into the mold chamber 23.

Preparation of coated plastic products, utilizing the mold configuration of FIG. 11, provides a coated plastic product comprising a plastic substrate "core" having chemically bonded to the entire surface thereof a protective coating material.

As will be readily apparent, the invention provides a number of advantages over the post-painting or in-mold coating of molded plastic products, as formerly practiced. Thus, in addition to avoiding the necessity for the extra painting step following fabrication of the molded plastic product, or the additional step of applying a coating containing a pigment to the mold surface prior to molding, the paint itself is eliminated along with the associated problems of masking, oven curing, mold cleaning, increased cycle times, washing, and odor and vapor control. The weather-stable protective coating material of the present invention provides better gloss control, with selection of desired gloss levels, and permits the use of multiple colors for the exposed surface. Finally, the weather-stable protective coating material generally replaces. i.e., eliminates the need for, the use of a mold release in those portions of the mold where the film is employed.

One of the keys to the long-term performance of the coated plastic product according to the invention is the chemically reactive nature of the molding process. The reactive molding process begins with two separate, low viscosity polymeric precursor liquid streams, or a single polymeric liquid stream containing a catalyst. The material is injected into the mold chamber, under conditions to ensure good mixing. The protective coating material surface is able to bond, both through actual covalent chemical bonds and non-covalent bonds, with the chemically reactive sites in the plastic substrate. This provides extremely high levels of adhesion even after severe environmental exposure. In some cases, the protective coating material may also be treated to enhance the chemical bonding between the protective coating material and the plastic substrate. Corona discharge treatment and organo metallic-type primer application are two proven methods to provide enhanced chemical bonding with certain protective coating materials.

The very low viscosity and surface tension characteristics of polyurethane precursor liquid RIM components serve to enhance the chemical bonding. This very low viscosity RIM mixture is able to "wet" the protective coating material surface more efficiently than higher viscosity materials. The wetting and penetration of the polymeric precursor liquid into the protective coating material surface results in very high levels of chemical bonding between the protective coating material and plastic substrate. However, higher viscosity polymeric precursors are nearly as effective in producing a tenacious bond between the protective coating material and the plastic substrate, according to the present invention.

It is to be understood that the forms of the invention herewith, shown and described, are to be taken as illustrative embodiments only of the same, and that various changes in the shape, size and arrangement of parts, as well as various procedural changes, may be resorted to without departing from the spirit and scope of the invention.

What is claimed is:

1. A process for preparing a coated plastic product, including a plastic substrate having chemically bonded to at least a portion of the surface thereof a protective coating material, comprising the steps of:
   (A) providing a mold, including at least two cooperating mold sections, having a cavity therein for forming the plastic substrate, wherein at least a portion of the cavity defined a mold cavity surface adjacent which a finished surface of the plastic product is to be molded;
   (B) disposing a film of the protective coating material across the mold cavity surface;

(C) closing the mold; and (D) injecting polymeric precursor materials into the cavity behind the protective coating material, whereby the polymeric precursor materials fill the mold cavity, simultaneously deform the protective coating material to substantially conform to the mold cavity surface, and react in situ to form the plastic substrate and simultaneously chemically react with the protective coating material at the interface therewith to chemically bond said plastic substrate to the protective coating material and form an integral, composite, coated plastic product.

2. The process for preparing a coated plastic product according to claim 1, wherein the protective coating material is conformed to substantially the entire mold cavity surface.

3. The process for preparing a coated plastic product, according to claim 1, further comprising the steps of:
(D) removing the coated plastic product from the cavity; and
(E) trimming the excess protective coating material from the coated plastic product.

4. The process for preparing a coated plastic product according to claim 1, wherein the disposing in step B comprises:
($B_1$) withdrawing the protective coating material from a continuous supply roll positioned at one end of the mold; and
($B_2$) thereafter accumulating the surplusage of the protective coating material upon a reel at the opposite end of the mold.

5. The process for preparing a coated plastic product, according to claim 4, wherein during steps $B_1$ and $B_2$, tension is applied to the protective coating material, both parallel and normal to the direction of movement of the material.

6. The process for preparing a coated plastic product, according to claim 4, wherein the continuous supply roll and the reel are positioned in such a manner so as to locate the protective coating material in a plane between the mold section as it is withdrawn across the mold cavity surface and thereafter the continuous supply roll and reel are repositioned in such a manner so as to contact the protective coating material with the mold section.

7. The process for preparing a coated plastic product, according to claim 6, wherein during the contacting of the web of protective coating material to the mold section, the marginal edges of the protective coating material are restrained against movement toward the center of the material.

8. The process for preparing a coated plastic product, according to claim 1, wherein prior to step D, a vacuum is applied to the mold cavity, so as to assist conformation of the coated plastic material to the mold cavity surface.

9. The process for preparing a coated plastic product, according to claim 1, wherein simultaneously with step D, a vacuum is applied to the mold cavity, so as to assist conformation of the protective coating material to the mold cavity surface.

10. The process for preparing a coated plastic product, according to claim 1, wherein prior to step D, heated air is introduced to the mold cavity, so as to assist conformation of the protective coating material to the mold cavity surface.

11. The process for preparing a coated plastic product according to claim 1, wherein the polymeric precursor materials are selected from the group consisting of precursors suitable for preparing polyurethanes polyesters, polyamides and epoxies.

12. The process for preparing a coated plastic product, according to claim 1, wherein the protective coating material is selected from the group consisting of polyvinyl chloride, acrylic polymers, polyethylene, polyesters, polyurethanes, polyvinylidene fluoride, and polyvinyl fluoride.

13. The process for preparing a coated plastic product according to claim 1, wherein the thickness of the protective coating material is from about 0.5 to about 15 mils.

14. The process for preparing a coated plastic product, according to claim 11, wherein the polymeric precursor materials are those used to prepare polyurethanes.

15. The process for preparing a coated plastic product, according to claim 12, wherein the protective coating material is polyvinyl chloride.

16. The process for preparing a coated plastic product, according to claim 13, wherein the thickness of the protective coating material is from about 3 to about 4 mils.

17. The process for preparing a coated plastic product, according to claim 1, wherein a surface of the protective coating material is pretreated to enhance the bonding of the protective coating material to the plastic substrate.

18. The process for preparing a coated plastic product, according to claim 1, wherein prior to step B, an organo metallic primer is applied to the surface of the protective coating material.

* * * * *